(12) United States Patent
Hebert et al.

(10) Patent No.: US 6,243,548 B1
(45) Date of Patent: Jun. 5, 2001

(54) METHOD FOR CONTROLLING AN IMAGING APPARATUS

(75) Inventors: James A. Hebert, Beaverton; James D. Rise, Lake Oswego; Jack E. Fanning, Portland; Kevin J. Mills, Sherwood; William D. Anderson, Wilsonville, all of OR (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/258,017

(22) Filed: Feb. 25, 1999

(51) Int. Cl.$^7$ .......................... G03G 15/00; G03G 21/02
(52) U.S. Cl. ................................. 399/79; 399/85
(58) Field of Search .................. 399/79, 82, 85, 399/87

(56) References Cited

U.S. PATENT DOCUMENTS

| 4,586,147 | 4/1986 | Tadokoro ......................... 364/550 |
| 5,038,319 | 8/1991 | Carter et al. ..................... 364/900 |
| 5,057,866 | 10/1991 | Hill, Jr. et al. . |
| 5,101,233 | 3/1992 | Ito et al. . |
| 5,282,127 | * 1/1994 | Mii ................................... 364/130 |
| 5,343,276 | 8/1994 | Yamashita et al. . |
| 5,636,008 | 6/1997 | LoBiondo et al. ................ 399/8 |

OTHER PUBLICATIONS

"Sixth Sense Technology", Xerox Website http://www.xerox.com/products/5690/six.htm, Sep. 11, 1997, p. 1–4.
"Lexmark's 'MarkTrack' Software Tracks Printer Usage Throughout the Enterprise", The Hard Copy Observer vol. 8, No. 8, 8/98, p. 41.
"QMS Introduces Bsize Magicolor Color Laser Printer", The Hard Copy Observer vol. 8, No. 9, 9/98, pp 47–50.
"Tektronix Bets the Ranch on a Bevy of New Color Printers", The Hard Copy Observer vol. 8, No. 11, 11/98, p. 57–69.

* cited by examiner

Primary Examiner—William J. Royer (57) ABSTRACT

A method for controlling an imaging apparatus based on an intelligent usage tracking system is provided. The method monitors use of the imaging apparatus over a period of time and uses the collected data to predict future use. The collected data is used to control the imaging apparatus to minimize warm-up delays and to maximize time in one or more standby modes.

23 Claims, 7 Drawing Sheets

| Hour | S | M | T | W | T | F | S | |
|---|---|---|---|---|---|---|---|---|
| 0 | φ | φ | φ | φ | φ | φ | φ | 12 AM |
| 1 | φ | φ | φ | φ | φ | φ | φ | 1 |
| 2 | φ | φ | φ | φ | φ | φ | φ | 2 |
| 3 | φ | φ | φ | φ | φ | φ | φ | 3 |
| 4 | φ | φ | φ | φ | φ | φ | φ | 4 |
| 5 | φ | φ | φ | φ | φ | φ | φ | 5 |
| 6 | φ | φ | φ | φ | φ | φ | φ | 6 |
| 7 | φ | 1 | 2 | φ | φ | 2 | φ | 7 |
| 8 | φ | 2 | 2 | 3 | 3 | 3 | φ | 8 |
| 9 | φ | 3 | 3 | 3 | 3 | 3 | φ | 9 |
| 10 | φ | 3 | 3 | 3 | 3 | 3 | φ | 10 |
| 11 | φ | 3 | 3 | 3 | 3 | 3 | φ | 11 |
| 12 | φ | 2 | 3 | 2 | 2 | 3 | φ | 12 PM |
| 13 | φ | 3 | 3 | 3 | 3 | 3 | φ | 1 |
| 14 | φ | 3 | 3 | 3 | 3 | 3 | φ | 2 |
| 15 | φ | 2 | 3 | 3 | 3 | 3 | φ | 3 |
| 16 | φ | 3 | 3 | 2 | 3 | 3 | φ | 4 |
| 17 | φ | 1 | 1 | 3 | 3 | 1 | φ | 5 |
| 18 | φ | φ | φ | 1 | φ | φ | φ | 6 |
| 19 | φ | φ | φ | φ | φ | φ | φ | 7 |
| 20 | φ | φ | φ | φ | φ | φ | φ | 8 |
| 21 | φ | φ | φ | φ | φ | φ | φ | 9 |
| 22 | φ | φ | φ | φ | φ | φ | φ | 10 |
| 23 | φ | φ | φ | φ | φ | φ | φ | 11 |

METHOD FOR CONTROLLING AN IMAGING APPARATUS

CROSS-REFERENCE TO RELATED APPLICATIONS

Not applicable.

STATEMENT REGARDING FEDERALLY SPONSORED RESEARCH OR DEVELOPMENT

Not applicable.

FIELD OF INVENTION

This invention relates generally to a method for controlling an imaging apparatus and, more specifically, to a method for collecting and analyzing data regarding use of the imaging apparatus and controlling the operation and various functions of the imaging apparatus based on the collected usage data.

BACKGROUND OF THE INVENTION

Many imaging apparatus, such as electrophotographic printers and copiers, ink jet printers and the like, utilize various operating modes and perform different functions that require a "warm-up" time when the imaging apparatus is not in a fully operational state. For example, an imaging apparatus may utilize a ready or operating mode and a standby mode. The operating mode corresponds to the imaging apparatus being in a fully operational status and ready to generate output. The standby mode corresponds to a reduced status in which the imaging apparatus remains powered up, but one or more of its imaging components is not ready to operate. For example, the temperatures of the apparatus' thermal components, such as a fuser or a heated ink jet print head, may be lowered. In an electrophotographic printer or copier, the laser mirrors may require "spinning up" before the imaging process may proceed. These situations are also encountered when the imaging apparatus is turned on from the off status.

Placing an imaging apparatus in a standby mode has the advantages of reducing power consumption and reducing thermal wear on the thermally sensitive components of the apparatus. For example, in a solid ink jet color printer, the temperature of the print head during printing and in the operating mode between print jobs may be in the range of about 140° C. In a standby mode, the temperature of the print head maybe lowered to a range of between about 95° C. and about 105° C., thereby reducing thermal wear and power consumption.

When an imaging apparatus is in a standby made, the imaging apparatus must return to the operating mode before imaging can begin. This imposes an undesirable delay on the imaging process. For example, in the Phaser® 360 solid ink color printer manufactured by Tektronix, Inc., the assignee of the present application, the printer can require approximately five minutes to raise the temperatures of the print head and associated ink reservoirs from the standby mode to the operating mode.

It is desirable to avoid warm up delays whenever possible. It is also desirable to maximize the time in a standby mode between imaging commands to minimize thermal wear and power consumption. One attempt to address these needs has involved the use of a timer to track the elapsed time between print commands. For example, the Phaser® 360 printer remains in the operating mode for a fixed period of time (four hours) after a print command is received, and thereafter enters the standby mode. When the next print command is received, the printer must warm-up from the standby mode before printing can begin.

Using a timer to control whether the printer is in an operating or a standby mode inevitably creates situations in which a print command is received while the imaging apparatus is in the standby mode. A timer also maintains the imaging apparatus in the operating mode for a fixed period of time regardless of whether imaging commands are typically received during this period. In this regard, the timer may keep the imaging apparatus in the operating mode even though print commands are rarely received during this period.

What is needed is an intelligent usage tracking system that is capable of monitoring actual use over a period of time and controlling the imaging apparatus based on prior use to minimize warm-up delays and maximize time in a standby mode.

SUMMARY OF THE INVENTION

It is an aspect of the present invention to provide a method for controlling an imaging apparatus.

It is another aspect of the present invention to provide a method for collecting data regarding use of the imaging apparatus during a period of time.

It is yet another aspect of the present invention to provide a method for utilizing the collected data to place the imaging apparatus in one of at least two modes.

It is a feature of the present invention that the method intelligently tracks user activity to customize the operation of the imaging apparatus according to usage patterns.

It is another feature of the present invention that the method periodically updates user activity information to reflect current usage.

It is an advantage of the present invention that the method minimizes undesirable warm-up delays by predicting typical usage periods and controlling the imaging apparatus to be in the operating mode for those periods.

It is another advantage of the present invention that the method reduces thermal wear on the imaging apparatus by maximizing time in one or more standby modes.

It is another advantage of the present invention that the method reduces power consumption by maximizing time in one or more standby modes.

It is still another advantage of the present invention that the method minimizes time in the operating mode when the imaging apparatus is not executing an imaging command.

To achieve the foregoing and other aspects, features and advantages, and in accordance with the purposes of the present invention as described herein, a method for controlling an imaging apparatus based on an intelligent usage tracking system is provided. The method monitors use of the imaging apparatus over a period of time and uses the collected data to predict future use. The collected data is used to control the imaging apparatus to minimize warm-up delays and to maximize time in one or more standby modes.

Still other aspects of the present invention will become apparent to those to skilled in this art from the following description wherein there is shown and described a preferred embodiment of this invention, simply by way of illustration of one of the modes best suited to carry out the invention. As it will be realized, the invention is capable of other different embodiments and its several details are capable of modifications in various, obvious aspects all without departing from the invention. Accordingly, the drawings and descriptions will be regarded as illustrative in nature and not as restrictive. And now for a brief description of the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
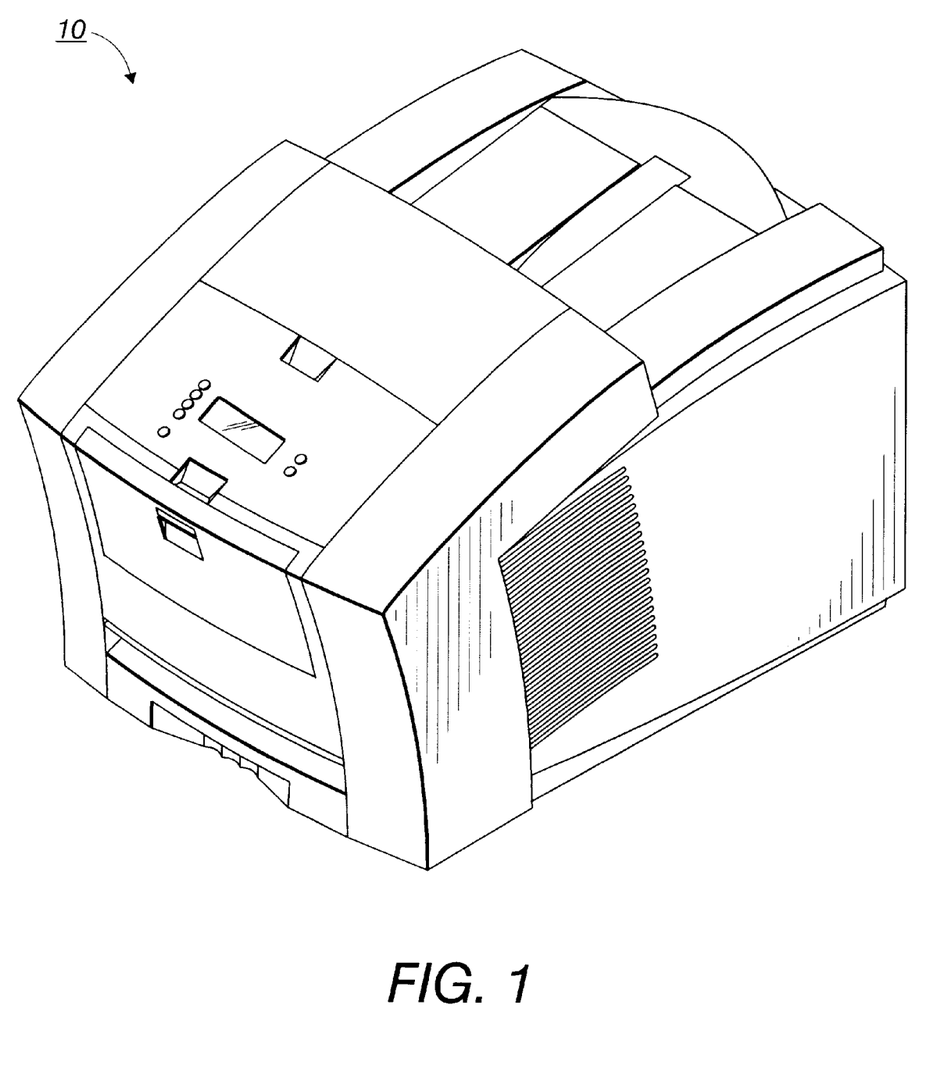
FIG. 1 is an overall perspective view of an ink jet printer that uses the method of the present invention.

FIG. 1 is an overall perspective view of a phase change ink jet printer, generally indicated by the reference numeral 10, that utilizes the method of the present invention. It will be appreciated that the present invention may be practiced with and embodied in various other imaging apparatus, such as aqueous ink jet printers, electrophotographic printers and copiers and any other imaging apparatus that utilize a warm up period. Accordingly, the following description is merely illustrative of one embodiment of the present invention.

The ink jet printing apparatus 10 is preferably designed to operate with phase change ink. Conventional phase change ink is initially solid at room temperature and is changed to a molten state by the application of heat energy to raise its temperature to between about 85° C. and about 150° C. For optimal jetting through an ink jet print head, the ink is maintained at a temperature of between about 120° C. and about 150° C. in the print head and in the ink reservoir that supplies liquid ink to the print head.

When the ink jet printer 10 is in an operating or ready mode, the print head and reservoir are maintained at or near the optimal jetting temperature for the phase change ink being used. The printer 10 may also enter other status conditions in which the print head and/or reservoir are maintained at a temperature lower than the optimal jetting temperature. For example, the printer may enter a printer standby mode. In one embodiment of the printer standby mode, the print head is maintained at a print head standby temperature of between about 94° C. and about 110° C., and preferably about 104° C. The reservoir is maintained at a reservoir standby temperature of between about 92° C. and about 112° C., and more preferably about 102° C.

The printer 10 may also utilize other standby modes that maintain the print head and/or reservoir at a temperature closer to but still lower than the required jetting temperature. For example, in one embodiment the print head is cooled to a jetstack standby temperature of between about 104° C. and about 124° C., and preferably about 114° C., while the reservoir is maintained at the reservoir operating temperature.

Advantageously, utilizing one or more standby modes reduces the thermal stress and wear in the print head and associated thermal components of the imaging apparatus. Changing the imaging apparatus from an operating mode to a standby mode also reduces power consumption. However, the time required to heat the print head and/or reservoir from a standby temperature to an operating temperature imposes an undesirable delay on the printing process. It would therefore be desirable to minimize these warm-up delays while also maximizing the time the imaging apparatus spends in one or more standby modes.

These competing interests are addressed in the present invention by providing a method for intelligently tracking and forecasting use of an imaging apparatus. The method tracks usage of the imaging apparatus and places the imaging apparatus in one of at least two modes according to the usage pattern. The method may place the imaging apparatus in an operating mode or one or more standby modes, may turn on or turn off the imaging apparatus, or may control other components of the imaging apparatus to optimize throughput based on prior use.

Figure 2:
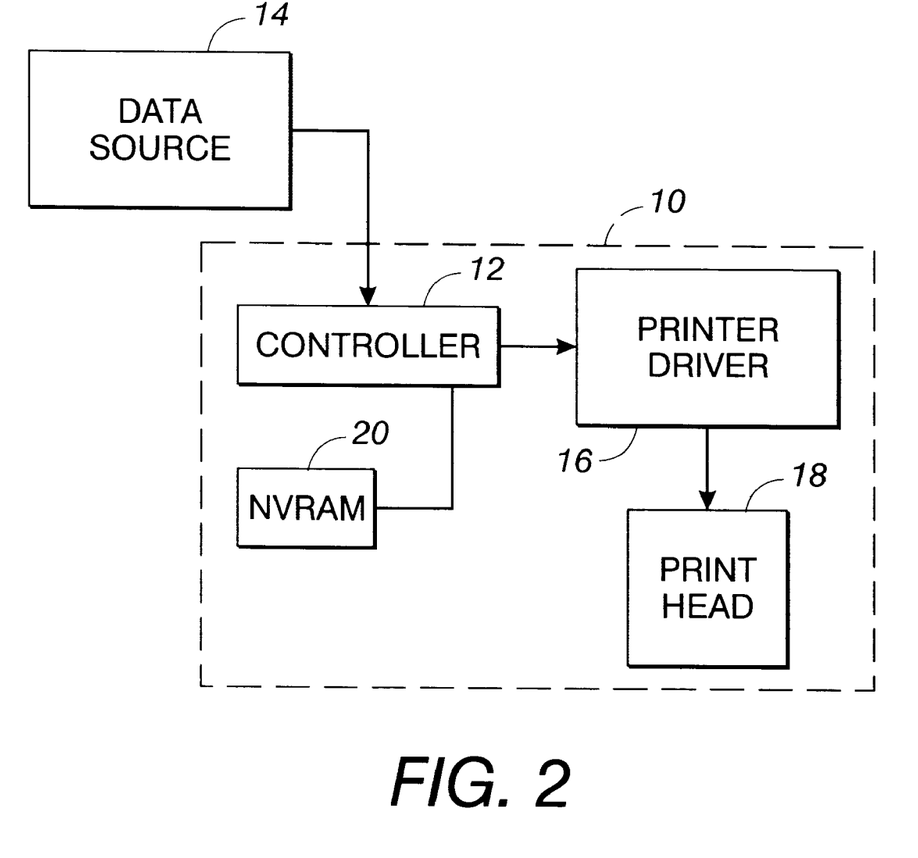
FIG. 2 is a schematic diagram showing the printer controller receiving print data from a data source and communicating with the printer driver and an NVRAM memory source.

As shown in FIG. 2, the printer 10 includes a controller 12 that receives imaging data from a data source 14. The controller 12 utilizes a printer driver 16 to process the imaging data and control the operation of the print head 18 and other imaging components (not shown) of the printer 10. The method of the present invention may be implemented in the controller's firmware. The controller 12 utilizes the method of the present invention to control the printer 10 according to prior usage patterns. A non-volatile memory source 20 (NVRAM) stores the usage pattern data generated by the present method, as described in more detail below.

With reference now to FIGS. 3–7, a preferred embodiment of the present invention will now be described. In its broadest aspects, the method of the present invention controls the printer 10 by collecting data regarding use of the printer during a period of time. The method uses the collected data to control the printer to minimize warm-up delays and to place the printer in the appropriate operating mode or standby mode based on the usage pattern.

Figure 3:
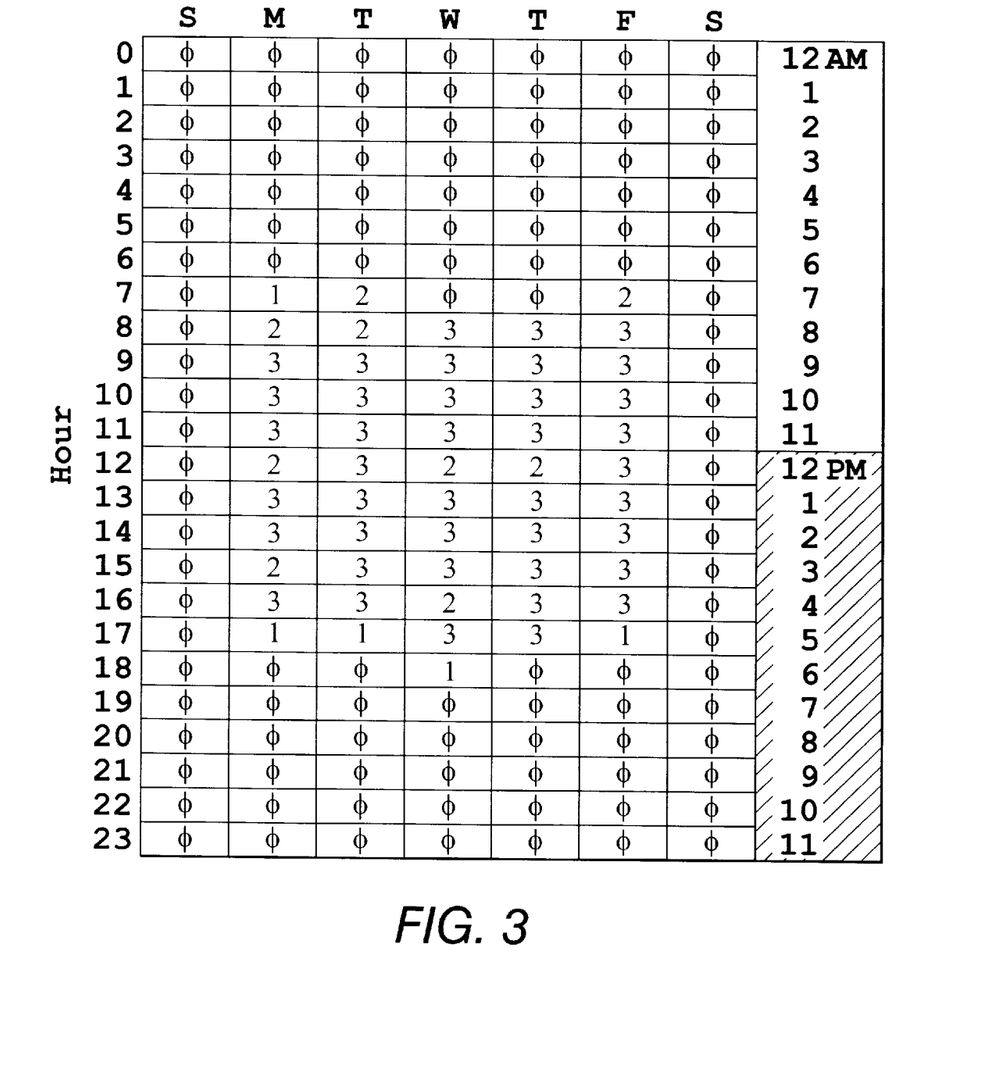
FIG. 3 shows a 24×7 array of elements and their associated values, with each element corresponding to one hour in a one week period.
Figure 4:
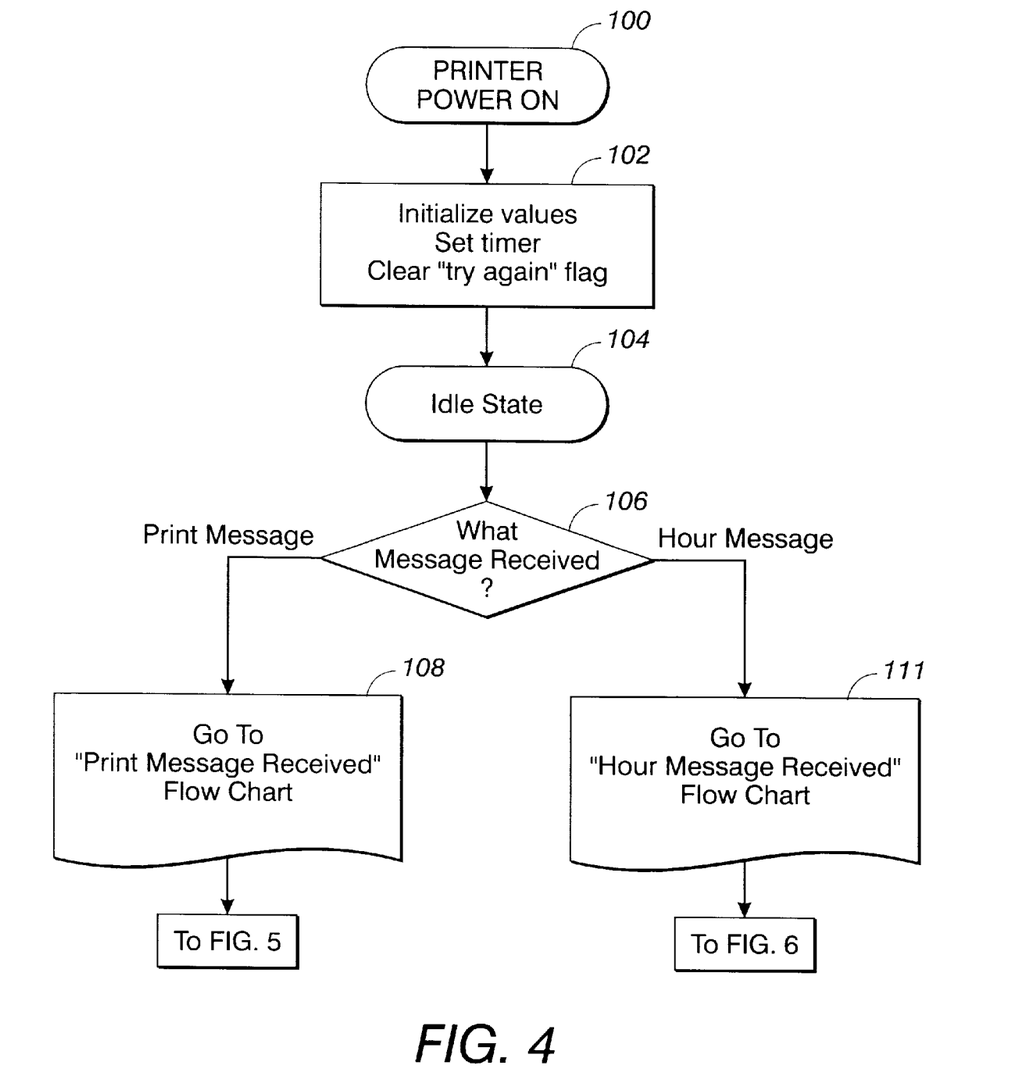
FIGS. 4–6 are functional block diagrams showing the steps of the method of the present invention.
Figure 6:
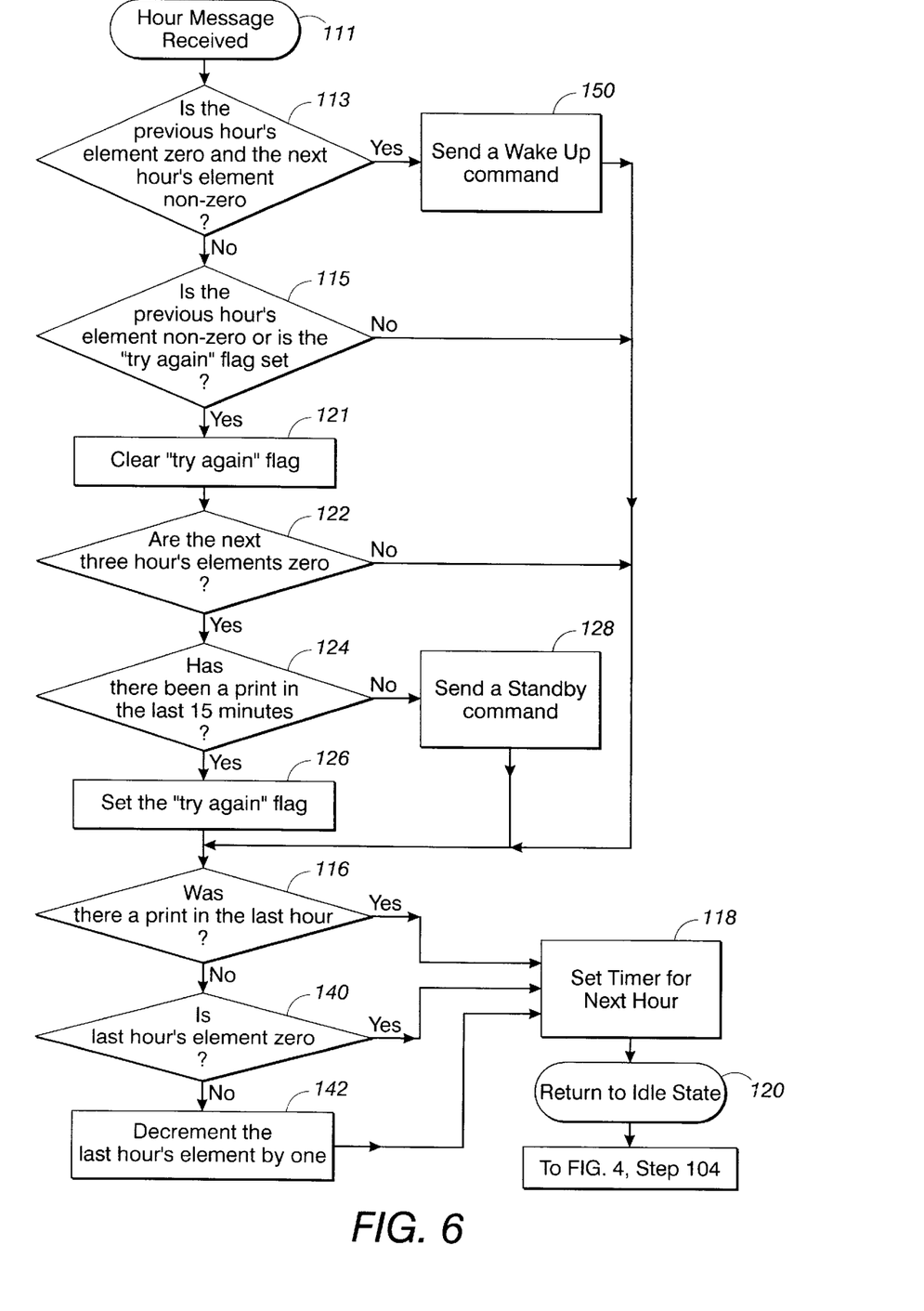
Figure 7:
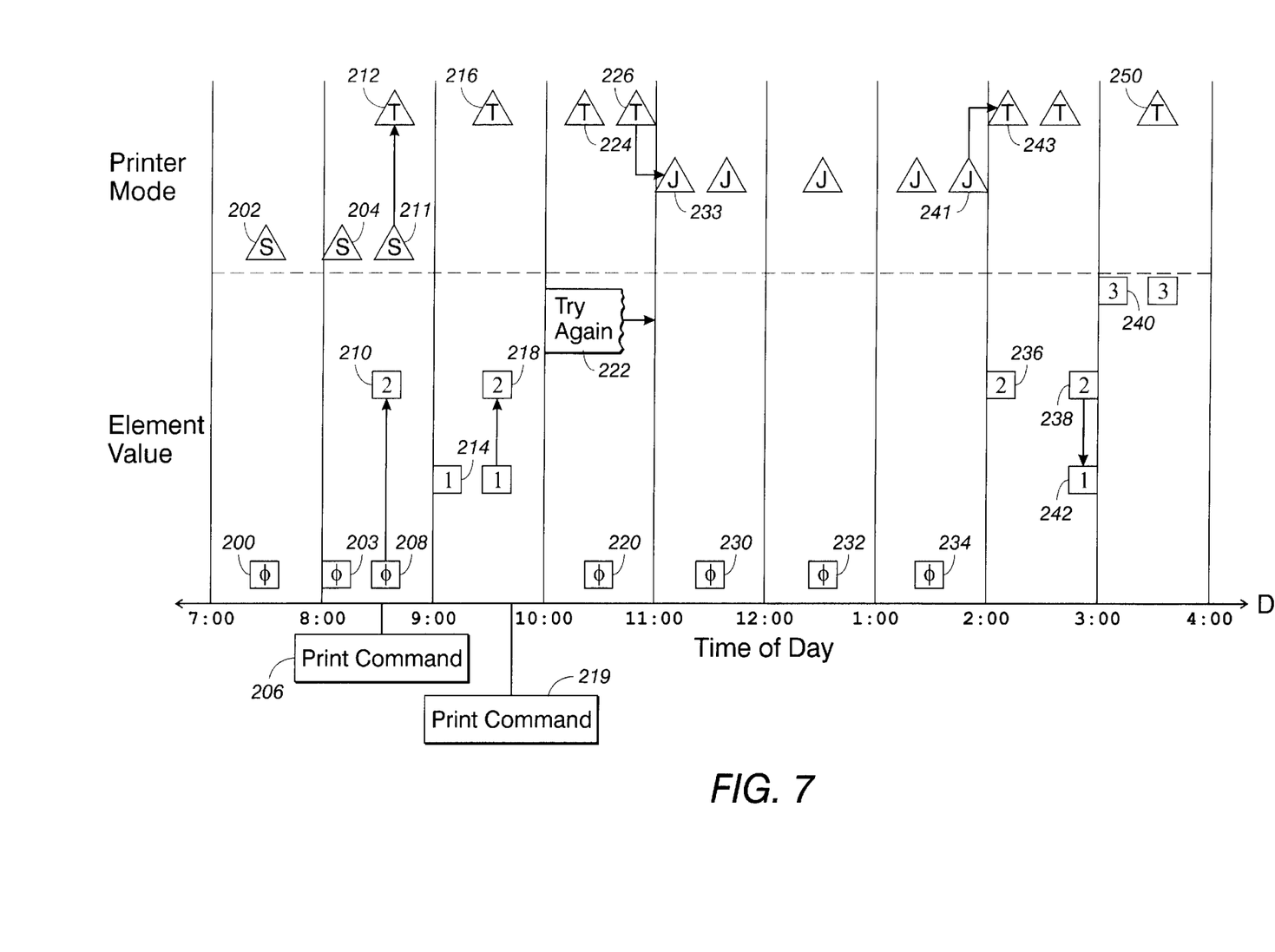
FIG. 7 is a schematic illustration of the operation of the method and its control of the printer over an exemplary nine hour period.

In a preferred embodiment, the method maps a usage pattern based on collected data for a recurring period of time. The usage data is collected and continuously updated over a one week period. Each day is preferably divided into a plurality of periods of about one hour each. The data is then organized into a 24×7 array of elements corresponding to each hour of the one week period. A usage pattern is mapped for each of the elements in the array by assigning a value to each element based on whether the printer has received a print command during that hour over a previous number of weeks. FIG. 3 shows an example of a 24×7 array of elements and their associated values. It will be appreciated that other methods may be utilized for tracking and quantifying a frequency of use of the imaging apparatus. For example, a histogram of a frequency distribution of use of the imaging apparatus may be developed. The method may then control the imaging apparatus as described above based on data from the histogram FIGS. 4–6 illustrate a preferred embodiment of the method of the present invention. FIG. 7 illustrates an example of the operation of the method and its control of the printer over an exemplary nine hour period. With reference now to FIG. 4, when the printer 10 is powered on from an off state (step 100), the controller 12 places the printer in the operating mode. The controller 12 then utilizes a real-time clock to set a timer for signaling the transition between a first period and a second period (step 102). The periods may be synchronized with the hours of the day, such that a transition between periods occurs on each hour change. Alternatively, the periods may not be correlated to the hours of the day. In step 102, the controller may also clear a "try again" flag, the function of which is explained in more detail below. Further, when a printer is powered on for the first time, step 102 may include the step of initializing all of the elements in the 24×7 array to an initial value.

After setting the timer and performing any of the other steps in step 102, the method enters an idle state (step 104) in which the controller waits for either a print message or an hour message from the timer (step 106).

FIG. 7 graphically illustrates the operation of the method of the present invention and its control of the printer 10 over a representative nine hour period of a day. The horizontal axis D indicates the time of day. The area immediately above axis D shows the value assigned to each one hour element or period. The value may be, but is not restricted to, an integer value and any number of different values may be used. In the preferred embodiment, the value of each element is an integer value of zero, one, two or three. Using a maximum element value of three corresponds to analyzing and collecting data for that period over a three week time frame. It will be appreciated that many other maximum element values may be utilized in practicing the method of the present invention.

In the column above each of the element values is the corresponding printer mode for that period. The printer mode is indicated by the letters T, J and S. Mode T corresponds to an operating mode in which the printer is ready to process and carry out a print command. Mode J represents a first standby mode and mode S represents a second standby mode.

A preferred embodiment of the present method will now be explained with reference to the exemplary nine hour time period shown in FIG. 7. Entering the 7:00 hour, the value for the 7:00 period (defined here as the time period between 7:00 and 8:00) is zero (200) and the printer is in the second standby mode S (202). During the 7:00 period the controller 12 waits for either a print message or an hour message (FIG. 4, step 106). At the transition from the 7:00 period to the 8:00 period, the controller 12 receives an hour message from the timer at the end of the 7:00 period (step 111, FIGS. 4 and 6). With reference now to FIG. 6, when the hour message is received the method determines whether the value of the element from the previous hour (7:00) is zero and the value of the element from the next hour (8:00) is non-zero (step 113). Because the value of the next hour's element (203) is not non-zero, the method proceeds to step 115 to determine whether the previous hour's element is non-zero or the "try again" flag is set (the "try again" flag is explained in more detail below). Because the previous hour's element is zero (200) and the "try again" flag is not set, the method proceeds to step 116 to determine if a print command was received in the previous hour. Because there was no print command in the previous hour, the method then determines if the previous hour's element (200) is zero (step 140). As the value of the 7:00 period element (203) is zero, the method then sets the timer for the next hour (step 118) and returns to the idle state 104 (step 120). Therefore, the printer mode is not changed at the transition from the 7:00 period to the 8:00 period and remains in the operating mode S (204) at the beginning of the 8:00 period.

With continued reference to FIG. 7, at approximately 8:30 a print command 206 is received by the controller 12. Just prior to the print command being received, the value of the element for the 8:00 period is zero (208) and the printer is in the second standby mode S (211). Upon receipt of the print command, the controller 12 immediately places the printer in the operating mode T (212) (this action of the controller occurs independently of the present method). As a general rule, any time that a print command is received the controller 12 will place the printer in the operating mode T regardless of the value of the element for that period.

Figure 5:
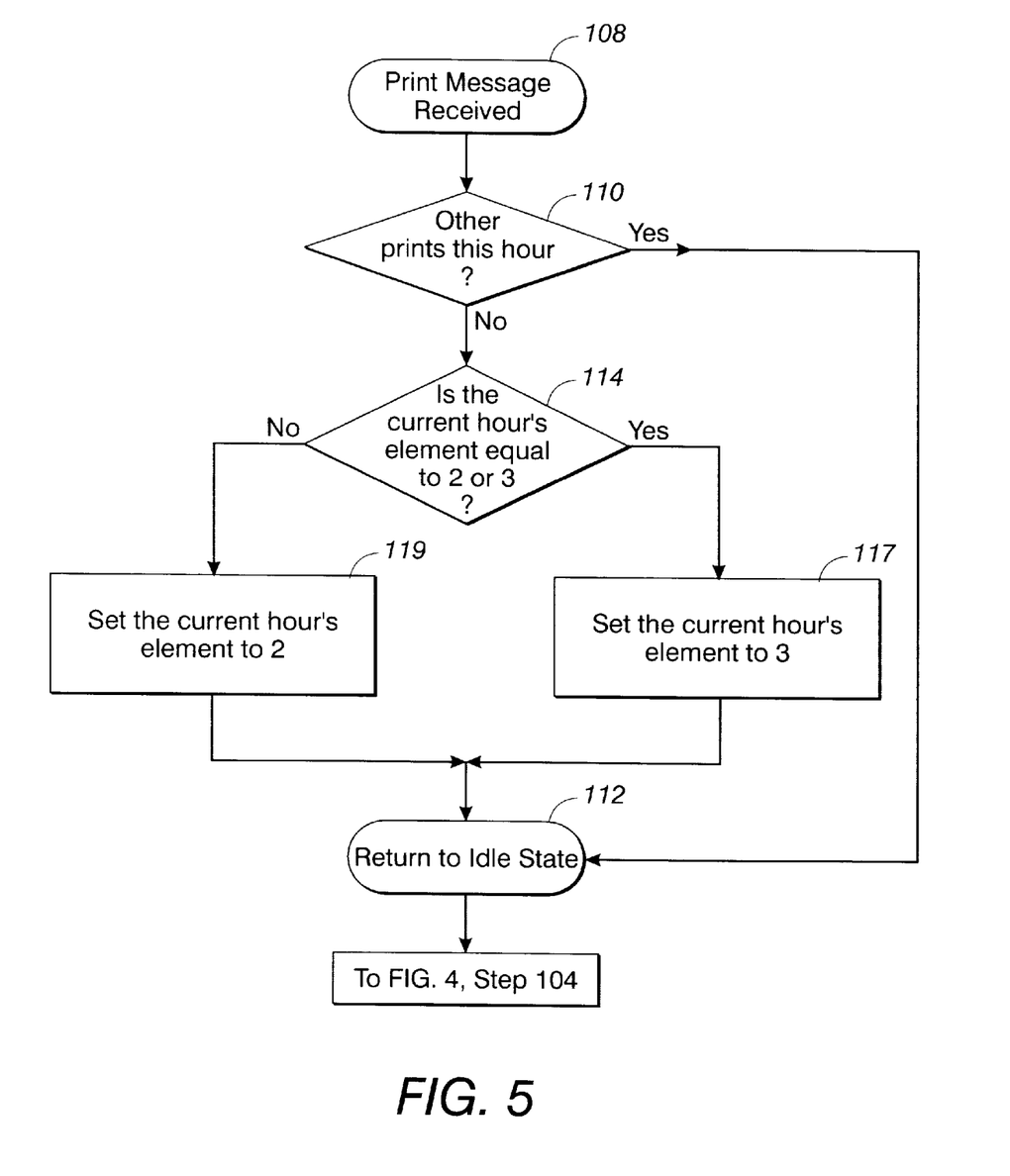

With reference now to FIGS. 4 and 5, when the print command 206 is received in step 108, the controller determines whether there have been other prints made during this particular period (step 110). If the answer to this query were yes, the method would return to the idle state 104 (step 112). This insures that when a plurality of print commands are received during a current period, the value of the element for the current period is incremented only once when the first print command is received for that period. Because no other prints were made during this period, the method then determines whether the current period's element value is equal to either two or three (step 114). If the answer to this query were yes, the method would set the value of the current hour's element to three (step 117). But because the current hour's element (208) is equal to zero, the method increments the current hour's element to a value of two (step 119), as indicated by element 210 in FIG. 7. The controller then returns to the idle state 104 (step 112).

At the next transition between the 8:00 period and the 9:00 period, the value of the 8:00 period element is now two (210) and the printer is in operating mode T (212). The value of the element for the next period (9:00) is one (214). At the end of the 8:00 period an hour message is received at step 106 (FIG. 4) and the controller executes steps 111, 113 and 115 of FIG. 6. With reference to step 115, because the value of the element of the previous hour (210) is non-zero, the method proceeds to steps 121 and 122. In step 122 the method determines whether the values of each of the next three hours' elements are zero. Because the value of the element of the next hour (214) is non-zero, the method proceeds to step 116 to determine if there was a print in the last hour (8:00). Because there was a print in the last hour, the method advances to step 118 to set the timer for the next hour and then returns to the idle state 104. Therefore, no change is made at this point to the mode of the printer, which remains in the operating mode T (216) for the 9:00 period.

At approximately 9:50 a print command 219 is received. Turning to step 108 in FIGS. 4 and 5, the method proceeds through steps 108, 110, 114, 119 and 112 to set the current hour's element value to two (218) and return to the idle state 104. At the next transition between the 9:00 period and the 10:00 period, the value of the 9:00 (previous) period element is now two (218) and the printer remains in operating mode T (216), while the value of the 10:00 (next) period is zero (220). At the end of the 9:00 period an hour message is received at step 106 (FIG. 4) and the controller executes steps 111, 113 and 115 of FIG. 6.

With reference to step 115, because the value of the element of the previous hour (218) is non-zero, the method proceeds to steps 121 and 122 and determines whether the next three hours' elements are zero. In this case, the values of the elements 220, 230, 232 of each of the next three hours (10:00, 11:00 and 12:00) are zero, and the method proceeds to step 124 to determine if a print has been made in a specified amount of time immediately preceding the period transition. The amount of time may be between about five minutes and about 30 minutes, and is more preferably about 15 minutes. If the answer to this query were No, the method would send a standby command to the printer (step 128) to place the printer in the first standby mode (J) or the second standby mode (S). However, because a print was made at 9:50, 10 minutes before the transition, the method sets the "try again" flag (222) (step 126) and proceeds through steps 116, 118 and 120 to return to the idle state 104 (the function of the "try again" flag will be explained with reference to the next transition). Thus, the printer remains in the operating mode T (224) for the next period (10:00). Advantageously, by maintaining the printer in the operating mode T for the next period, step 124 assures that the printer does not "shut down" in the middle of a print job that was received near the end of a period.

At the next transition between the 10:00 period and the 11:00 period, the value of the 10:00 (previous) period element has remained at zero (220) and the printer remains in operating mode T (226), while the value of the 11:00 (next) period is zero (230). At the end of the 10:00 period an hour message is received at step 106 (FIG. 4) and the controller proceeds to step 113 of FIG. 6. Because the value of the element for the next hour is zero (not non-zero), the method proceeds to step 115. Because the "try again" flag 222 is set, the method proceeds to clear the "try again" flag (step 121) and determine whether the next three hours' elements are zero (step 122). Because the value of the elements 230, 232, 234 of each of the next three hours (11:00, 12:00 and 1:00) are zero, the method proceeds to step 124 to determine if a print has been made in the last 15 minutes. Because no print has been made in the last 15 minutes, the method proceeds to step 128 and sends a standby command to the printer. In the preferred embodiment, the standby command of step 128 places the printer in the first standby mode J (233).

The method then proceeds to step 116 to determine if a print was made in the last hour. Because no print was made, the method proceeds to step 140 to determine if the value of the last hour's element (220) is zero. Because the value of element 220 is zero, the method proceeds to steps 118 and 120 and returns to the idle state 104. Thus, the printer enters the 11:00 period in the first standby mode J.

At the next two transitions (11:00–12:00 and 12:00–1:00), the method advances through steps 111, 113,115, 116,118 and 120. The values (232) and (234) for each of the next two periods remain at zero, and the printer remains in the first standby mode J during these periods. In one embodiment, a timer may be used to change the printer from the first standby mode J to the second standby mode S after a predetermined amount of time in the first standby mode J. For example, where the printer remains in the first standby mode J for one hour, the timer may then signal the printer to enter the second standby mode S.

At the transition from 1:00 to 2:00, the value of the 1:00 (previous) period element has remained at zero (234), while the value of the 2:00 (next) period is two (236). At the end of the 1:00 period an hour message is received at step 106 (FIG. 4) and the controller proceeds to step 113 of FIG. 6. Because the value of the element for the previous hour is zero and the value of the next hour's element is non-zero, the method proceeds to step 150 and sends a wake-up command that changes the printer from the first standby mode J (241) to the operating mode T (243). The method then proceeds through steps 116, 140, 118 and 120 to return to the idle state 104. Thus, the printer enters the 2:00 period in the operating mode T.

At the transition from 2:00 to 3:00, the value of the 2:00 (previous) period element has remained at two (238), while the value of the 3:00 (next) period is three (240). At the end of the 2:00 period an hour message is received at step 106 (FIG. 4) and the controller proceeds to step 113 of FIG. 6. Because the value of the previous hours' element (238) is non-zero, the method proceeds through steps 113, 115 and 121 to step 122. Because the value of the next hours' element is non-zero, the method proceeds to step 116. Because a print was not made in the last hour, the method proceeds to step 140. Because the value of the last hour's element is not zero but two (238), the method proceeds to step 142 and the value of the last hour's element 238 is decremented by one to a value of one (242). The method then proceeds through steps 118 and 120 to return to the idle state 104, and the printer remains in the operating mode T (250) for the next period. Thus, at the end of the 2:00 period the valve of the element for that period (242) is one.

The foregoing description of a preferred embodiment of the invention has been presented for purposes of illustration and description. It is not intended to be exhaustive or to limit the invention to the precise form disclosed. The terms and expressions which have been employed in the foregoing specification are used therein as terms of description and not of limitation. The use of such terms and expressions is not intended to exclude equivalents of the features shown and described or portions thereof. For example, the term "controller" as used herein is intended to include microprocessors, microcomputers, ASICs and dedicated discrete hardware devices serving the function of a controller. Many changes, modifications, and variations in the materials and arrangement of parts can be made, and the invention may be utilized with various different imaging apparatus, all without departing from the inventive concepts disclosed herein.

The preferred embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when the claims are interpreted in accordance with breadth to which they are fairly, legally, and equitably entitled.

What is claimed is:

1. A method of controlling an imaging apparatus, the method comprising the steps of:
   collecting data regarding use of the imaging apparatus during a period of time;
   mapping a usage pattern based on the data for the period of time; and
   controlling the imaging apparatus to place the imaging apparatus in one of at least two modes based on the usage pattern.

2. A method of controlling an imaging apparatus, the method comprising the steps of:
   collecting data regarding use of the imaging apparatus during a period of time;
   mapping a usage pattern based on the data for the period of time;
   controlling the imaging apparatus to place the imaging apparatus in one of at least two modes based on the usage pattern;
   collecting data regarding use of the imaging apparatus during each hour over a one week period;
   organizing the data in a 24×7 array of elements corresponding to each hour of the one week period;
   and wherein the step of mapping a usage pattern of the imaging apparatus further includes the step of mapping a usage pattern for each of the elements in the array.

3. The method of controlling an imaging apparatus of claim 2, wherein the step of mapping a usage pattern for each of the elements in the array further includes the step of:

assigning a value to at least a first element in the array of elements based on whether the imaging apparatus has received a print command during the hour.

4. The method of controlling an imaging apparatus of claim 1, wherein the step of controlling the imaging apparatus to place the imaging apparatus in one of at least two modes based on the usage pattern further includes the step of controlling the imaging apparatus to place the imaging apparatus in either an operating mode or a standby mode based on the usage pattern.

5. The method of controlling an imaging apparatus of claim 1, wherein the step of controlling the imaging apparatus to place the imaging apparatus in one of at least two modes based on the usage pattern further includes the step of controlling the imaging apparatus to either turn on the imaging apparatus or turn off the imaging apparatus based on the usage pattern.

6. A method of controlling an imaging apparatus, the method comprising the steps of:

collecting data regarding use of the imaging apparatus during a period of time;

developing a histogram of a frequency distribution of use of the imaging apparatus based on the data; and controlling the imaging apparatus to place the imaging apparatus in one of at least two modes based on the histogram.

7. A method of controlling an imaging apparatus, the imaging apparatus utilizing at least an operating mode and a standby mode, the method comprising the steps of:

dividing a day into a plurality of periods;

assigning a value to each of the periods;

at a transition from a first period to a second period, if the imaging apparatus is in the standby mode and the value of the first period is a first value and the value of the second period is a second value, then controlling the imaging apparatus to place the imaging apparatus in the operating mode at a beginning of the second period of time.

8. The method of controlling an imaging apparatus of claim 7, further including the step of:

at the transition from the first period to the second period, if the imaging apparatus is in the operating mode and the value of the first period is the second value and the value of the second period is the first value, then controlling the imaging apparatus to place the imaging apparatus in the standby mode at the beginning of the second period of time.

9. The method of controlling an imaging apparatus of claim 8, further including the step of dividing the day into a plurality of periods of about one hour each.

10. The method of controlling an imaging apparatus of claim 9, further including the step of assigning an integer value to each of the plurality of periods.

11. A method of controlling an imaging apparatus, the imaging apparatus including at least an operating mode and a standby mode, the method comprising the steps of:

dividing a day into a plurality of periods;

assigning a value to each of the periods;

at a transition from a first period to a second period, if the imaging apparatus is in the standby mode during the first period and a value of the second period is non-zero, then controlling the imaging apparatus to place the imaging apparatus in the operating mode at the beginning of the second period.

12. The method of controlling an imaging apparatus of claim 11, wherein the second period is followed by a third period, and the third period is followed by a fourth period, and further including the step of:

at the transition from the first period to the second period, if the imaging apparatus is in the operating mode during the first period and a value of the second period, a value of the third period and a value of the fourth period are each zero, then controlling the imaging apparatus to place the imaging apparatus in the standby mode at the beginning of the second period.

13. The method of controlling an imaging apparatus of claim 12, further including the step of:

if the imaging apparatus is in the operating mode during the first period and the value of the second period, the value of the third period and the value of the fourth period are each zero and a print command was received between about 5 minutes and about 25 minutes prior to the transition from the first period to the second period, then maintaining the imaging apparatus in the operating mode during the second period.

14. The method of controlling an imaging apparatus of claim 11, further including the step of:

at the transition from the first period to the second period, if the value of the first period is non-zero and no print command was received during the first period, then decrementing the value of the first period.

15. The method of controlling an imaging apparatus of claim 14, wherein the step of decrementing the value of the first period comprises decrementing the value of the first period by one.

16. The method of controlling an imaging apparatus of claim 11, further including the step of:

if a print command is received during a current period of the plurality of periods, then incrementing the value of the current period.

17. The method of controlling an imaging apparatus of claim 16, further including the step of:

if a print command is received during the current period and the value of the current period is zero, then incrementing the value to two.

18. The method of controlling an imaging apparatus of claim 17, further including the step of:

if a print command is received during the current period and the value of the current period is one or two, then incrementing the value by one.

19. The method of controlling an imaging apparatus of claim 18, further including the step of:

if a print command is received during the current period and the value of the current period is three, then maintaining the value at three.

20. The method of controlling an imaging apparatus of claim 19, further including the step of:

if a plurality of print commands are received during the current period, then incrementing the value of the current period only once when a first of the plurality of print commands is received.

21. The method of controlling an imaging apparatus of claim 11, further including the step of dividing the day into a plurality of periods of about one hour each.

22. The method of controlling an imaging apparatus of claim 11, further including the step of performing the method in an ink jet printer.

23. The method of controlling an imaging apparatus of claim 22, further including the step of performing the method in a phase change ink color printer.

* * * * *